(12) United States Patent
Gum

(10) Patent No.: US 9,928,500 B2
(45) Date of Patent: Mar. 27, 2018

(54) LOCATION-BASED SYSTEM PERMISSIONS AND ADJUSTMENTS AT AN ELECTRONIC DEVICE

(71) Applicant: QUALCOMM Incorporated, San Diego, CA (US)

(72) Inventor: Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 14/627,935

(22) Filed: Feb. 20, 2015

(65) Prior Publication Data

US 2015/0170134 A1    Jun. 18, 2015

Related U.S. Application Data

(62) Division of application No. 12/349,236, filed on Jan. 6, 2009, now Pat. No. 8,961,619.

(51) Int. Cl.
*G06F 11/30* (2006.01)
*G06F 7/04* (2006.01)
(Continued)

(52) U.S. Cl.
CPC ......... *G06Q 20/3224* (2013.01); *G06F 21/31* (2013.01); *G06F 21/316* (2013.01);
(Continued)

(58) Field of Classification Search
CPC ........ G06F 21/31; G06F 21/316; G06F 21/51; G06F 21/604; G06F 21/6209;
(Continued)

(56) References Cited

U.S. PATENT DOCUMENTS 5,243,652 A    9/1993   Teare et al.
5,535,431 A    7/1996   Grube et al.
(Continued)

FOREIGN PATENT DOCUMENTS

CN      1842797 A     10/2006
CN    101073219 A     11/2007
(Continued)

OTHER PUBLICATIONS

Sun, Bo, et al. "Enhancing security using mobility-based anomaly detection in cellular mobile networks." Vehicular Technology, IEEE Transactions on 55.4 (2006): 1385-1396.*
(Continued)

*Primary Examiner* — Michael J Simitoski
(74) *Attorney, Agent, or Firm* — Muncy, Geissler, Olds & Lowe, P.C.

(57) ABSTRACT

Securing access to a portable electronic device (PED), securing e-commerce transactions at an electronic device (ED) and dynamically adjusting system settings at a PED are disclosed. In an example, usage or mobility characteristics of the PED or ED (e.g., a location of the ED or PED, etc.) are compared with current parameters of the PED or ED. A determination as to whether to permit an operation (e.g., access, e-commerce transaction, etc.) at the ED or PED can be based at least in part upon a degree to which the current parameters conform with the usage or mobility characteristics. In another example, at least a current location of a PED can be used to determine which system settings to load at the PED.

13 Claims, 9 Drawing Sheets

(51) Int. Cl.
*G06Q 20/32* (2012.01)
*G06F 21/31* (2013.01)
*H04W 48/04* (2009.01)
*G06F 21/51* (2013.01)
*G06F 21/60* (2013.01)
*G06F 21/62* (2013.01)
*G06F 21/74* (2013.01)
*G06F 21/81* (2013.01)
*H04L 29/06* (2006.01)
*H04W 4/02* (2018.01)
*H04W 12/08* (2009.01)
*G06Q 20/12* (2012.01)
*G08B 13/00* (2006.01)
*G08B 21/00* (2006.01)
*G08B 29/00* (2006.01)

(52) U.S. Cl.
CPC ............ *G06F 21/51* (2013.01); *G06F 21/604* (2013.01); *G06F 21/6209* (2013.01); *G06F 21/74* (2013.01); *G06F 21/81* (2013.01); *G06Q 20/12* (2013.01); *H04L 63/107* (2013.01); *H04W 4/021* (2013.01); *H04W 12/08* (2013.01); *H04W 48/04* (2013.01); *G06F 2221/2105* (2013.01); *G06F 2221/2107* (2013.01); *G06F 2221/2111* (2013.01); *G06F 2221/2141* (2013.01); *G06F 2221/2143* (2013.01); *G06F 2221/2147* (2013.01); *G06F 2221/2149* (2013.01)

(58) Field of Classification Search
CPC .. G06F 21/74; G06F 21/81; G06F 2221/2105; G06F 2221/2107; G06F 2221/2111; G06F 2221/2141; G06F 2221/2143; G06F 2221/2147; G06F 2221/2149; G06Q 20/3674; G06Q 20/12; G06Q 20/3224; H04L 63/107; H04L 2463/102; H04W 12/08; H04W 48/04; H04W 4/021; H04W 12/06; H04W 4/02; H04W 12/12; H04W 4/00
See application file for complete search history.

(56) References Cited

U.S. PATENT DOCUMENTS

| | | | |
|---|---|---|---|
| 5,844,522 A | 12/1998 | Sheffer et al. | |
| 5,922,073 A | 7/1999 | Shimada | |
| 6,009,116 A * | 12/1999 | Bednarek | G01S 19/14 340/5.74 |
| 6,011,973 A | 1/2000 | Valentine et al. | |
| 6,166,688 A | 12/2000 | Cromer et al. | |
| 6,308,273 B1 * | 10/2001 | Goertzel | G06F 21/6218 726/2 |
| 6,463,276 B1 | 10/2002 | Jonsson | |
| 6,577,274 B1 | 6/2003 | Bajikar | |
| 6,748,195 B1 | 6/2004 | Phillips | |
| 6,778,837 B2 | 8/2004 | Bade et al. | |
| 6,804,699 B1 | 10/2004 | Henrie | |
| 6,954,147 B1 | 10/2005 | Cromer et al. | |
| 7,000,116 B2 * | 2/2006 | Bates | G06F 21/31 713/182 |
| 7,051,196 B2 * | 5/2006 | Angelo | G06F 21/31 380/258 |
| 7,080,402 B2 * | 7/2006 | Bates | G06F 21/6218 380/258 |
| 7,107,349 B2 | 9/2006 | Britt et al. | |
| 7,469,139 B2 | 12/2008 | Van De Groenendaal | |
| 7,546,639 B2 | 6/2009 | Bantz et al. | |
| 7,591,020 B2 * | 9/2009 | Kammer | G06F 21/6218 380/258 |
| 7,792,297 B1 * | 9/2010 | Piccionelli | H04L 63/10 380/258 |
| RE43,070 E | 1/2012 | Henrie | |
| 8,095,115 B2 | 1/2012 | Van De Groenendaal | |
| 8,112,785 B1 | 2/2012 | Cooley et al. | |
| 8,196,169 B1 | 6/2012 | Herz | |
| 8,218,766 B2 * | 7/2012 | Sahai | G06F 21/10 380/258 |
| 8,789,136 B2 | 7/2014 | Erhart et al. | |
| 2001/0011352 A1 | 8/2001 | O'Mahony | |
| 2002/0124067 A1 * | 9/2002 | Parupudi | G06F 21/62 709/223 |
| 2002/0160745 A1 | 10/2002 | Wang | |
| 2003/0034192 A1 | 2/2003 | Takano et al. | |
| 2003/0061166 A1 * | 3/2003 | Saito | G06F 21/6218 705/54 |
| 2003/0065805 A1 * | 4/2003 | Barnes, Jr. | G06Q 10/02 709/231 |
| 2003/0097590 A1 | 5/2003 | Syvanne et al. | |
| 2003/0105971 A1 | 6/2003 | Angelo et al. | |
| 2003/0145222 A1 * | 7/2003 | Gittler | G06F 21/62 726/17 |
| 2003/0167405 A1 | 9/2003 | Freund et al. | |
| 2003/0177389 A1 | 9/2003 | Albert et al. | |
| 2003/0217122 A1 | 11/2003 | Roese et al. | |
| 2003/0220835 A1 * | 11/2003 | Barnes, Jr. | G06Q 10/1053 705/14.36 |
| 2004/0056759 A1 | 3/2004 | Ungs | |
| 2004/0123150 A1 | 6/2004 | Wright et al. | |
| 2004/0205194 A1 * | 10/2004 | Sahai | G06F 21/10 709/228 |
| 2005/0044404 A1 | 2/2005 | Bhansali et al. | |
| 2005/0055578 A1 | 3/2005 | Wright et al. | |
| 2005/0071666 A1 | 3/2005 | Chu et al. | |
| 2005/0097320 A1 * | 5/2005 | Golan | G06F 21/40 713/166 |
| 2005/0193144 A1 | 9/2005 | Hassan et al. | |
| 2005/0246098 A1 | 11/2005 | Bergstrom et al. | |
| 2005/0272445 A1 * | 12/2005 | Zellner | H04L 41/12 455/456.2 |
| 2005/0275406 A1 | 12/2005 | Hatalkar et al. | |
| 2006/0059265 A1 | 3/2006 | Keronen | |
| 2006/0085177 A1 | 4/2006 | Toyama et al. | |
| 2006/0095389 A1 | 5/2006 | Hirota et al. | |
| 2006/0112418 A1 * | 5/2006 | Bantz | G06F 21/88 726/4 |
| 2007/0032225 A1 | 2/2007 | Konicek et al. | |
| 2007/0038761 A1 * | 2/2007 | Tebeka | G01S 5/0252 709/228 |
| 2007/0101438 A1 | 5/2007 | Govindarajan | |
| 2007/0143825 A1 | 6/2007 | Goffin | |
| 2007/0206741 A1 | 9/2007 | Tiliks et al. | |
| 2007/0250920 A1 * | 10/2007 | Lindsay | G06F 21/31 726/7 |
| 2008/0004888 A1 * | 1/2008 | Davis | G06Q 20/3224 705/26.1 |
| 2008/0032705 A1 | 2/2008 | Patel et al. | |
| 2008/0033637 A1 | 2/2008 | Kuhlman et al. | |
| 2008/0052395 A1 | 2/2008 | Wright et al. | |
| 2008/0076459 A1 | 3/2008 | Shaju | |
| 2008/0146193 A1 | 6/2008 | Bentley et al. | |
| 2008/0148059 A1 * | 6/2008 | Shapiro | G06F 21/32 713/186 |
| 2008/0155649 A1 | 6/2008 | Maler et al. | |
| 2008/0209521 A1 | 8/2008 | Malaney | |
| 2008/0227471 A1 | 9/2008 | Dankar et al. | |
| 2008/0242286 A1 | 10/2008 | Appaji | |
| 2008/0256097 A1 | 10/2008 | Messer et al. | |
| 2008/0261662 A1 | 10/2008 | Ashbrook et al. | |
| 2009/0100168 A1 | 4/2009 | Harris | |
| 2009/0131015 A1 | 5/2009 | Bentley et al. | |
| 2009/0138592 A1 * | 5/2009 | Overcash | H04L 63/1425 709/224 |
| 2009/0144833 A1 | 6/2009 | Gushiken | |
| 2009/0157560 A1 * | 6/2009 | Carter | G06Q 10/0633 705/80 |

(56) References Cited

U.S. PATENT DOCUMENTS

| | | | |
|---|---|---|---|
| 2009/0165125 A1 | 6/2009 | Brown et al. | |
| 2009/0197584 A1* | 8/2009 | Snow | H04M 1/72577 455/418 |
| 2009/0247122 A1 | 10/2009 | Fitzgerald et al. | |
| 2009/0251282 A1 | 10/2009 | Fitzgerald et al. | |
| 2010/0017874 A1 | 1/2010 | Piccinini et al. | |
| 2010/0024017 A1 | 1/2010 | Ashfield et al. | |
| 2010/0056105 A1 | 3/2010 | Erhart et al. | |
| 2010/0100972 A1 | 4/2010 | Lemieux et al. | |
| 2010/0134275 A1* | 6/2010 | Fitzgerald | G06F 21/88 340/539.13 |
| 2010/0134299 A1* | 6/2010 | Fitzgerald | G06F 21/88 340/573.1 |
| 2010/0169949 A1* | 7/2010 | Rothman | G06F 21/35 726/1 |
| 2010/0175116 A1 | 7/2010 | Gum | |
| 2011/0282697 A1* | 11/2011 | Fitzgerald | G06F 21/88 705/4 |
| 2013/0305357 A1* | 11/2013 | Ayyagari | H04L 63/14 726/22 |
| 2014/0200929 A1* | 7/2014 | Fitzgerald | G06F 21/88 705/4 |

FOREIGN PATENT DOCUMENTS

| | | |
|---|---|---|
| JP | 2003078952 A | 3/2003 |
| JP | 2003196566 A | 7/2003 |
| JP | 2004118456 A | 4/2004 |
| JP | 2004258845 A | 9/2004 |
| JP | 2006127293 A | 5/2006 |
| JP | 2007102441 A | 4/2007 |
| JP | 2008009556 A | 1/2008 |
| JP | 2008234560 A | 10/2008 |
| TW | I229804 B | 3/2005 |
| WO | WO-03034192 A1 | 4/2003 |

OTHER PUBLICATIONS

International Search Report and Written Opinion—PCT/US2009/069489, International Search Authority—European Patent Office—dated Jul. 1, 2010.

Invitation to Pay Additional Fees—PCT/US2009/069489, International Search Authority—European Patent Office—dated Mar. 26, 2010.

Taiwan Search Report—TW098145359—TIPO—dated Jul. 23, 2013.

* cited by examiner

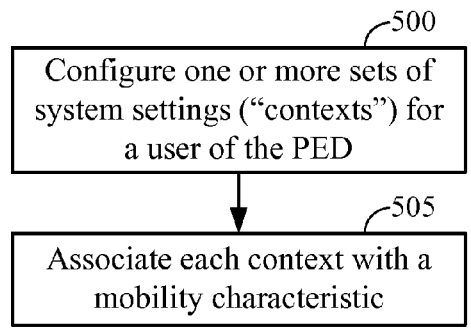
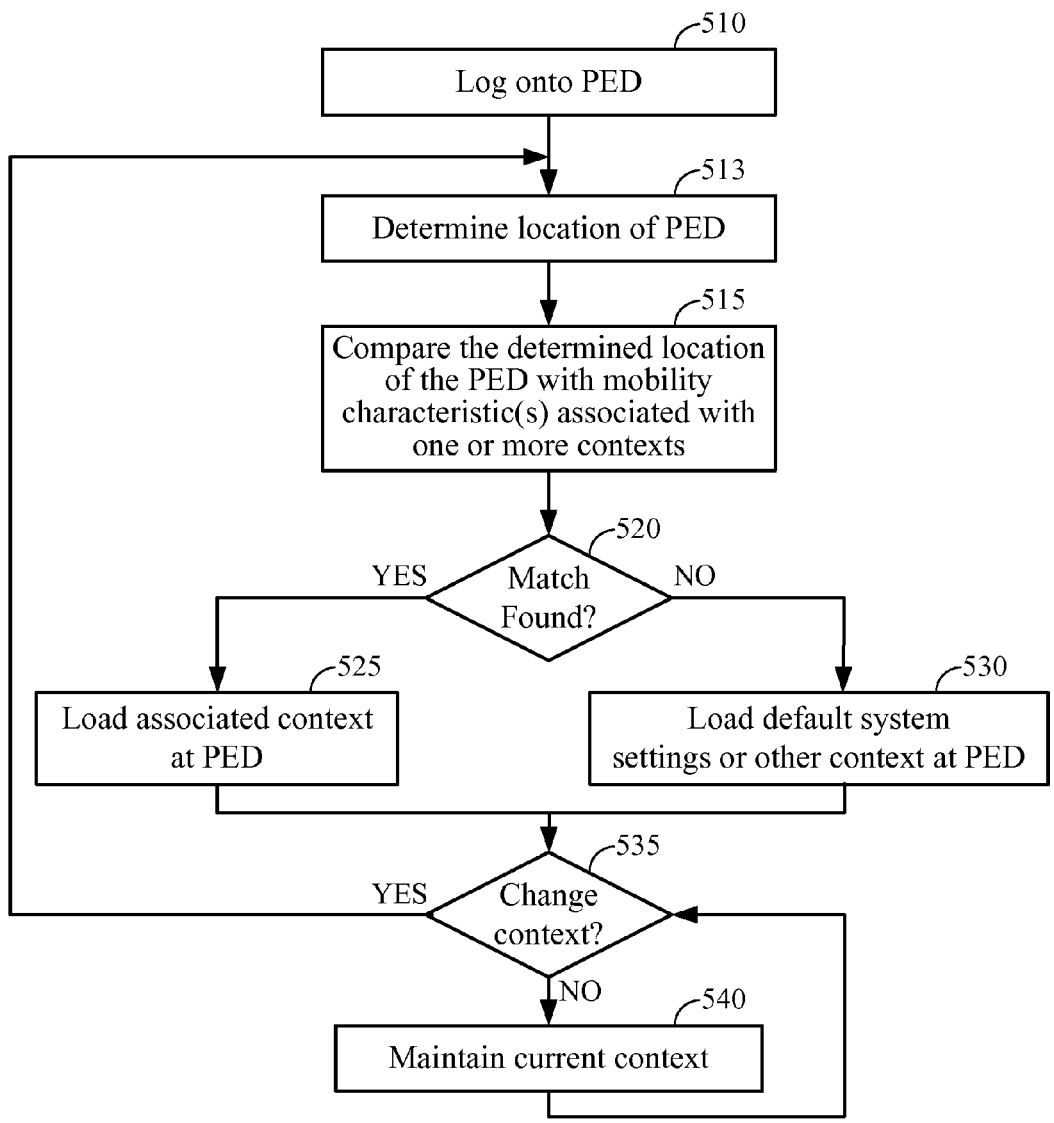

LOCATION-BASED SYSTEM PERMISSIONS AND ADJUSTMENTS AT AN ELECTRONIC DEVICE

RELATED APPLICATIONS

This application is a divisional and claims priority to U.S. patent application Ser. No. 12/349,236, entitled "LOCATION-BASED SYSTEM PERMISSIONS AND ADJUSTMENTS AT AN ELECTRONIC DEVICE" filed Jan. 6, 2009 assigned to the assignee hereof and is expressly incorporated by reference herein.

FIELD OF DISCLOSURE

Aspects of the invention are directed to securing access to a portable electronic device, securing e-commerce transactions at an electronic device and dynamically adjusting system settings at a portable electronic device.

BACKGROUND

Laptop computers and other types of portable electronic devices are gradually replacing desktop computers both in the workplace and in personal settings. Portable electronic devices offer users more flexibility in terms of where to work. This is facilitating changes in work behavior, such that users can work from their home or office with the same device.

While portable electronic devices, such as laptop computers, theoretically allow users to work from anywhere, it is typical that users will establish a predictable usage pattern. For example, if an employee in San Francisco is issued a laptop computer, that employee is likely to use that laptop in a few locations, such as the employee's home, the employee's office, a favorite coffee shop, etc. However, if the laptop computer was detected operating in Madagascar, the computer's operation would typically be considered to be outside of the predictable usage pattern for the worker. It is possible that operation outside of the predictable usage pattern is valid (e.g., if the worker is on business in Madagascar), but it is also possible that the laptop computer has been stolen. Laptop theft is becoming a serious issue, and can lead to the revealing of sensitive information, such as trade secrets, customer lists, credit and social security information, etc.

Further, it is typical for users of portable electronic devices to store their log-in and password information on their device. This allows the users to more easily engage in e-commerce transactions because the users need not manually enter their log-in and password information. However, this practice poses a security risk in the event of laptop theft, because the thief would be able to easily access the user's personal information (e.g., to make e-commerce purchases, assume the user's identity, etc.). Also, identify theft is becoming a serious concern in e-commerce transactions, and can affect both portable electronic devices as well as stationary or static electronic devices, such as desktop PCs. Here, the issue is that the authenticating information (e.g., password, social security number, etc.) has been compromised and can no longer adequately authenticate the user.

Further, in addition to a need to prevent generalized unauthorized use of portable electronic devices, there is a growing need to manage and automate authorized use of portable electronic devices both in the workplace and the home (e.g., where one device is used across different environments, each having different usage requirements). For example, a small business owner might use a laptop computer for both personal use as well as business use. This type of dual personal/business use can result in different requirements and preferred settings for each environment. For example, the user may prefer a different desktop background or screensaver, or may want different applications readily accessible for personal versus business use. Conventionally, the user would manually change the settings as necessary based on whether the user is in a personal or business setting, which is time consuming and tedious.

SUMMARY

An aspect of the invention is directed to a method of managing permission and authorization for actions and information access on a portable electronic device, including detecting an attempt to access the portable electronic device, determining whether usage characteristics associated with the detected attempt conform with a usage profile of the portable electronic device, the usage profile including one or more pre-defined usages of the portable electronic device, each pre-defined usage associated with a location characteristic of the portable electronic device and permitting access to the portable electronic device if the usage characteristics are determined to conform with the usage profile.

Another aspect of the invention is directed to a method of establishing dynamic system settings at a portable electronic device, including determining current location information of the portable electronic device, determining whether the current location information satisfies one or more pre-defined mobility characteristics, each of the pre-defined mobility characteristics including at least one location criterion and loading at least one system setting at the portable electronic device based on whether the current location information satisfies the one or more pre-defined mobility characteristics.

Another aspect of the invention is directed to a method of securing e-commerce transactions to an electronic device, including detecting an attempt to conduct an e-commerce transaction at the electronic device, determining whether usage characteristics associated with the detected attempt conform with an e-commerce usage profile associated with the electronic device or a user of the electronic device, the e-commerce usage profile including one or more pre-defined usages of the portable electronic device, each usage associated with a location characteristic of the portable electronic device and determining whether to permit the e-commerce transaction at the electronic device based on whether the usage characteristics conform with the e-commerce usage profile.

Another aspect of the invention is directed to a method of managing settings on an electronic device, including determining a location of the electronic device, determining a confidence level that indicates an expected accuracy of the determined location, retrieving one or more operation level values that are associated with one or more operations from a lookup table based on the determined location and confidence level, different operation level values corresponding to different settings for an associated operation and executing a given operation based on an associated operation level value among the retrieved one or more operation level values.

Another aspect of the invention is directed to a portable electronic device, including means for detecting an attempt to access the portable electronic device, means for determining whether usage characteristics associated with the detected attempt conform with a usage profile of the portable electronic device, the usage profile including one or more pre-defined usages of the portable electronic device, each pre-defined usage associated with a location characteristic of the portable electronic device and means for permitting access to the portable electronic device if the usage characteristics are determined, by the means for determining, to conform with the usage profile.

Another aspect of the invention is directed to a portable electronic device, including means for determining current location information of the portable electronic device, means for determining whether the current location information satisfies one or more pre-defined mobility characteristics, each of the pre-defined mobility characteristics including at least one location criterion and means for loading at least one system setting at the portable electronic device based on whether the current location information satisfies the one or more pre-defined mobility characteristics.

Another aspect of the invention is directed to an electronic device, including means for detecting an attempt to conduct an e-commerce transaction at the electronic device, means for determining whether usage characteristics associated with the detected attempt conform with an e-commerce usage profile associated with the electronic device or a user of the electronic device, the e-commerce usage profile including one or more pre-defined usages of the portable electronic device, each usage associated with a location characteristic of the portable electronic device and means for determining whether to permit the e-commerce transaction at the electronic device based on whether the usage characteristics conform with the e-commerce usage profile.

Another aspect of the invention is directed to an electronic device, including means for determining a location of the electronic device, means for determining a confidence level that indicates an expected accuracy of the determined location, means for retrieving one or more operation level values that are associated with one or more operations from a lookup table based on the determined location and confidence level, different operation level values corresponding to different settings for an associated operation and means for executing a given operation based on an associated operation level value among the retrieved one or more operation level values.

Another aspect of the invention is directed to a portable electronic device, including logic configured to detect an attempt to access the portable electronic device, logic configured to determine whether usage characteristics associated with the detected attempt conform with a usage profile of the portable electronic device, the usage profile including one or more pre-defined usages of the portable electronic device, each pre-defined usage associated with a location characteristic of the portable electronic device and logic configured to permit access to the portable electronic device if the usage characteristics are determined, by the logic configured to determine, to conform with the usage profile.

Another aspect of the invention is directed to a portable electronic device, including logic configured to determine current location information of the portable electronic device, logic configured to determine whether the current location information satisfies one or more pre-defined mobility characteristics, each of the pre-defined mobility characteristics including at least one location criterion and logic configured to load at least one system setting at the portable electronic device based on whether the current location information satisfies the one or more pre-defined mobility characteristics.

Another aspect of the invention is directed to an electronic device, including logic configured to detect an attempt to conduct an e-commerce transaction at the electronic device, logic configured to determine whether usage characteristics associated with the detected attempt conform with an e-commerce usage profile associated with the electronic device or a user of the electronic device, the e-commerce usage profile including one or more pre-defined usages of the portable electronic device, each usage associated with a location characteristic of the portable electronic device and logic configured to determine whether to permit the e-commerce transaction at the electronic device based on whether the usage characteristics conform with the e-commerce usage profile.

Another aspect of the invention is directed to an electronic device, including logic configured to determine a location of the electronic device, logic configured to determine a confidence level that indicates an expected accuracy of the determined location, logic configured to retrieve one or more operation level values that are associated with one or more operations from a lookup table based on the determined location and confidence level, different operation level values corresponding to different settings for an associated operation and logic configured to execute a given operation based on an associated operation level value among the retrieved one or more operation level values.

Another aspect of the invention is directed to a computer-readable medium comprising instructions, which, when executed by a portable electronic device, cause the portable electronic device to perform operations, the instructions including program code to detect an attempt to access the portable electronic device, program code to determine whether usage characteristics associated with the detected attempt conform with a usage profile of the portable electronic device, the usage profile including one or more pre-defined usages of the portable electronic device, each pre-defined usage associated with a location characteristic of the portable electronic device and program code to permit access to the portable electronic device if the usage characteristics are determined, by the program code to determine, to conform with the usage profile.

Another aspect of the invention is directed to a computer-readable medium comprising instructions, which, when executed by a portable electronic device, cause the portable electronic device to perform operations, the instructions including program code to determine current location information of the portable electronic device, program code to determine whether the current location information satisfies one or more pre-defined mobility characteristics, each of the pre-defined mobility characteristics including at least one location criterion and program code to load at least one system setting at the portable electronic device based on whether the current location information satisfies the one or more pre-defined mobility characteristics.

Another aspect of the invention is directed to a computer-readable medium comprising instructions, which, when executed by an electronic device, cause the electronic device to perform operations, the instructions including program code to detect an attempt to conduct an e-commerce transaction at the electronic device, program code to determine whether usage characteristics associated with the detected attempt conform with an e-commerce usage profile associated with the electronic device or a user of the electronic device, the e-commerce usage profile including one or more pre-defined usages of the portable electronic device, each usage associated with a location characteristic of the portable electronic device and program code to determine whether to permit the e-commerce transaction at the electronic device based on whether the usage characteristics conform with the e-commerce usage profile.

Another aspect of the invention is directed to a computer-readable medium comprising instructions, which, when executed by an electronic device, cause the electronic device to perform operations, the instructions including program code to determine a location of the electronic device, program code to determine a confidence level that indicates an expected accuracy of the determined location, program code to retrieve one or more operation level values that are associated with one or more operations from a lookup table based on the determined location and confidence level, different operation level values corresponding to different settings for an associated operation and program code to execute a given operation based on an associated operation level value among the retrieved one or more operation level values.

BRIEF DESCRIPTION OF THE DRAWINGS

The accompanying drawings are presented to aid in the description of aspects of the invention and are provided solely for illustration of the aspects and not limitation thereof.

FIGS. 5A and 5B illustrate a location-based system settings process according to another aspect of the invention.

DETAILED DESCRIPTION

Figure 1:
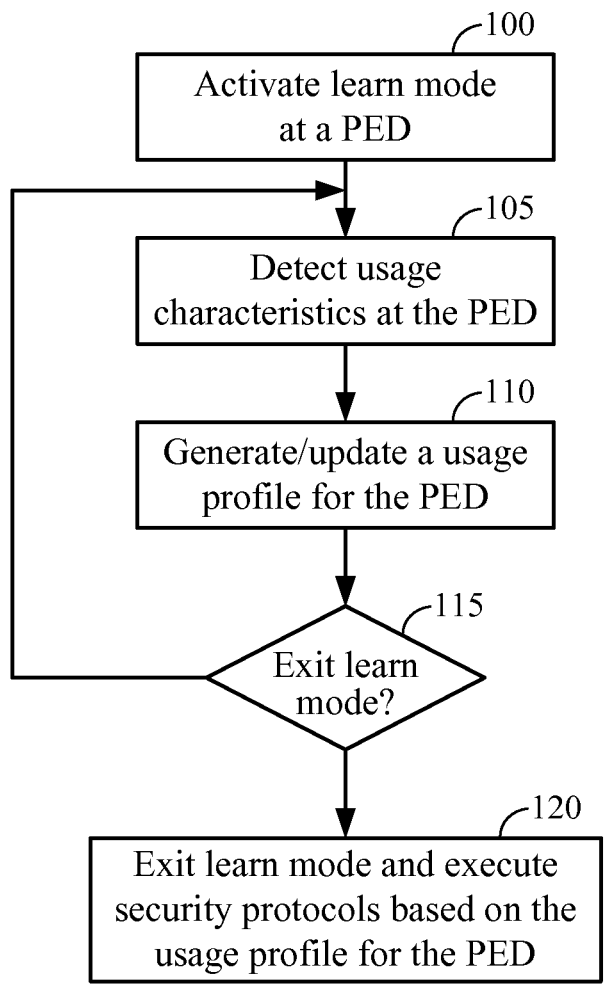
FIG. 1 illustrates a learn mode of operation performed at a portable electronic device.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Conventionally, user authorizations and user settings in portable electronic devices have been established in a manner consistent with stationary devices (e.g., desktop computers). In other words, conventional portable electronic devices do not take the location of the portable electronic device into account in determining system settings such as authorization for general access or for e-commerce activity, or for more general system settings such as desktop background, etc. Accordingly, aspects of the invention are directed to portable electronic devices (e.g., laptop computers, smart-phones, etc.) that determine user authorization and other user settings based on a current location (e.g., GPS position, etc.) or current location characteristics (e.g., local access point or router information, etc.) of the portable electronic device.

In order to better understand an aspect of the invention, a "learn mode" is described below with respect to FIG. 1. The learn mode is a mode of operation of a portable electronic device (PED) wherein usage characteristics (e.g., location, time of use, environmental information such as which wireless signals or sounds are received at the PED, etc.) are stored in a "usage profile" for the user of the portable electronic device. Then, a process of authenticating user access based on the usage profile is described with respect to FIG. 3.

FIG. 1 illustrates a learn mode of operation performed at a PED. In an example, the PED can be a laptop computer, a cellular phone, or any other type of electronic device.

Referring to FIG. 1, the user instructs the portable PED to enter or activate learn mode, 100. For example, the user may select a learn mode option that is displayed to the user via a display on the PED. Next, in 105, the PED detects usage characteristics at the PED. As used herein, "usage characteristics" means one or more parameters that can be used to describe a current operating environment of a PED or electronic device (ED) that is not necessarily portable (e.g., parameters measured while the PED is being "used" or accessed, or parameters manually entered by a user). For example, the usage characteristic parameters can be default parameters, or user-defined parameters. These parameters may include environment variables, such as a location of the PED and/or signals received at the PED (e.g., cellular signals from base stations, WiFi signals from access point, satellite positioning signals (SPS) from satellites, sounds, etc.), and use variables, such as which files and directories are accessed, which programs and data are most often used in a particular environment and when/where particular financial institutions or other organizations are accessed.

The usage characteristics may be determined in various manners including, but not limited to, (i) an access point (AP) that acts as a wired or wireless gateway for the portable electronic device, (ii) an estimate of a position of the portable electronic device obtained via satellite-based or other positioning system (SPS) protocols, trilateration and/ or the location of a subnet associated with an internet protocol (IP) address of the device (or any other well-known positioning technique).

In a further example, calendar information (e.g., days of the week when the PED is typically accessed, times of the day when the PED is typically accessed, linking to a user's calendar schedule to determine which days the user is expected to access the portable electronic device, etc.) may also be detected in 105. However, calendar information can sometimes be either faked or misinterpreted (e.g., a user's calendar indicates the user is scheduled to attend a meeting that was actually canceled). Thus, the calendar information may constitute an additional consideration, but is not necessarily the only factor used to determine the usage or location characteristics of the user. In 110, a usage profile is either generated or updated based on the detected usage characteristics at the PED. For example, if no usage profile for the user exists prior to 110, the detected usage from 105 is added to a new usage profile. Otherwise, the detected usage from 105 is appended to an existing usage profile. The usage profile is a list of conditions associated with that user's expected use of the PED. The conditions in the usage profile correspond to the parameters that qualify as usage characteristics, as discussed above. Thus, when usage characteristics are measured or monitored by the PED, the usage characteristics can be compared against the usage profile to determine whether the PED's usage characteristics confirm with the usage profile.

Alternatively, instead of the actual detected usage being added to the usage profile, the user can be prompted to select, as default for a given environment, security settings and/or 'contexts' (e.g., contexts are discussed in greater detail below with respect to FIGS. 5A/5B). In this example, a "set as default for this operating environment" option may be provided as part of a pull down menu for key behaviors. The user may further have the ability to fill in the blanks in a form (e.g., through pull down menus for the available options) such that the entire set of variables for a particular environment can be managed at once. The form may have entry areas for programs that show on the screen as clickable items or in pull down menus, information that is readily available versus information that is hidden or encrypted, connectivity options, screen savers, backgrounds, etc.

Figure 2:
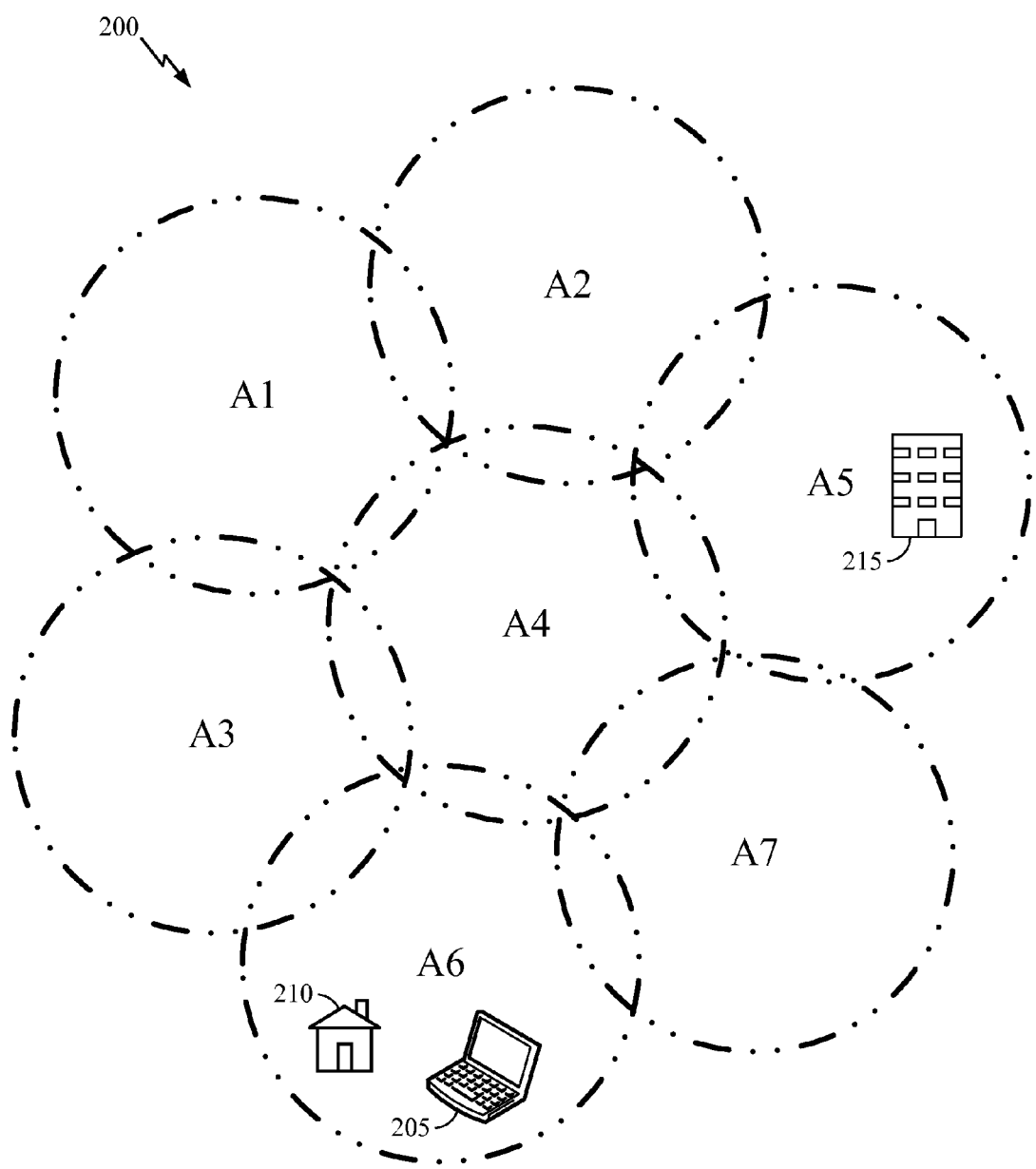
FIG. 2 illustrates a wireless communications network according to an aspect of the invention.

FIG. 2 illustrates a wireless communications network 200 according to an aspect of the invention. In particular, FIG. 2 illustrates an example of adding geographic position usage characteristics to a usage profile of a PED 205. As shown in FIG. 2, the PED 205 is illustrated as a laptop computer. However, it will be appreciated that other aspects of the invention can be directed to any type of PED.

Referring to FIG. 2, the wireless communications network 200 includes a plurality of sectors A1 through A7. The sectors A1 through A7 may correspond to actual geographic position ranges, expected coverage areas of one or more base stations or access points, and/or any other type of geographic partition methodology. The wireless communications network 200 further includes a PED 205, a residential home 210 of a user of the PED 205, as well as a work office 215 of the user. Next, assume that the PED 205 has engaged learn mode, and that the user of the PED 205 logs onto the PED 205 in sector A6 in proximity to the residential home 210. Accordingly, in 110, the PED 205 adds sector A6 to the usage profile of the PED 205. In 115, the PED 205 determines whether to exit learn mode. For example, the user of the PED 205 can manually instruct the PED 205 to exit learn mode. In another example, learn mode may be configured for exit after a given amount of time, which may be configured by the user upon entry into learn mode at 100 and/or defaulted by the PED 205 for exiting after a default period of time. Assume the PED 205 remains in learn mode, and the process returns to 105. Next, assume that the user logs onto the PED 205 in sector A5 in proximity to the work office 215. According, the sector A5 access is detected in 105, and the PED 205 adds sector A5 to the usage profile of the PED 205, 110. In an example, if there is a conflict between access point or other potentially portable ID versus base station ID or SPS, the less malleable (e.g., the least insecure or 'fakeable') measure can take precedent to discourage faking the signal environment.

Next, assume that the user of the PED 205 determines to exit learn mode in 115, and the process advances to 120. In 120, learn mode is de-activated and the PED 205 launches security protocols based on the usage profile that has been developed, during learn mode, for the PED 205. These security protocols will be discussed in greater detail below with respect to FIGS. 3 and 4.

Figure 3:
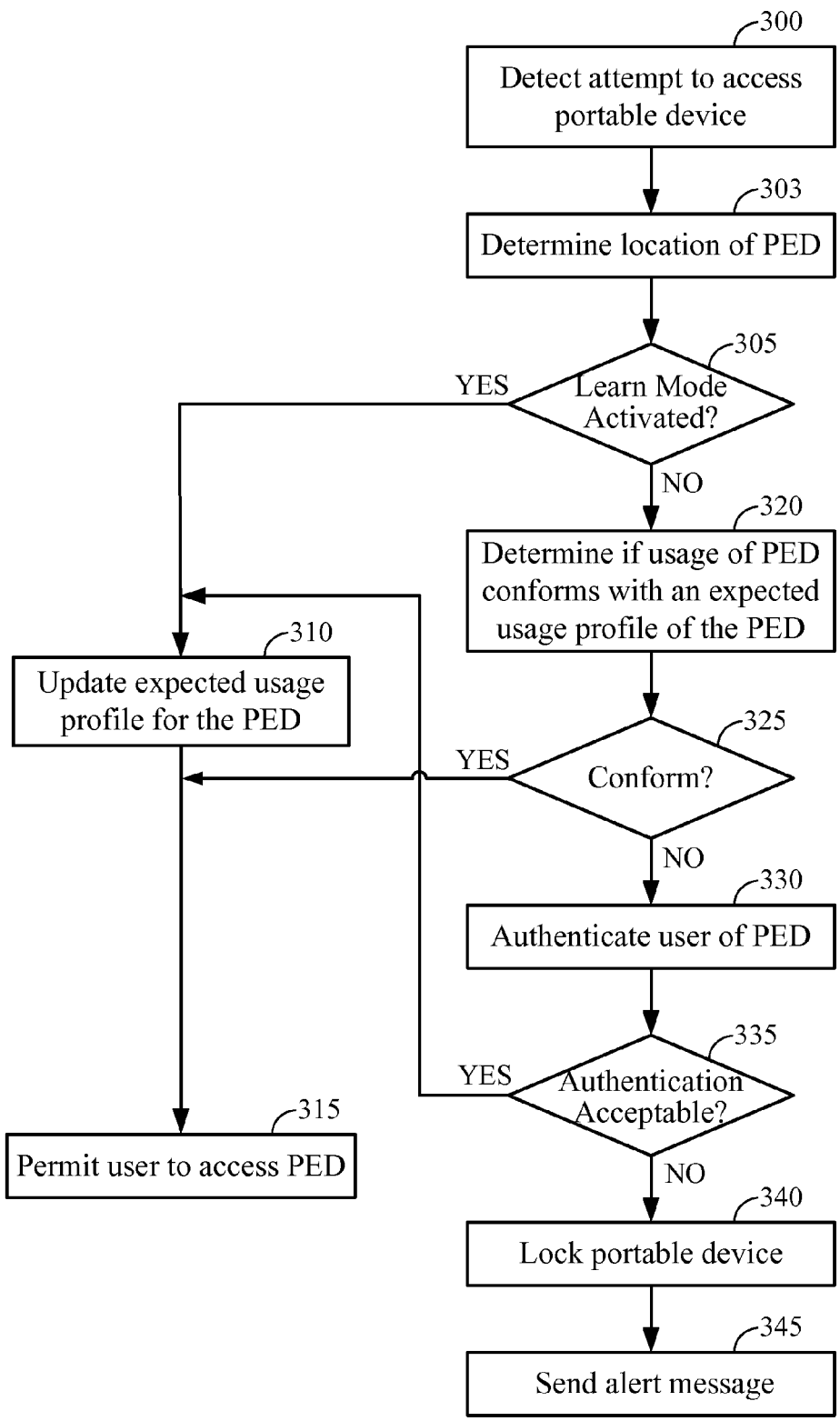
FIG. 3 illustrates access security protocols of a PED based on a usage profile according to an aspect of the invention.

FIG. 3 illustrates access security protocols of a PED based on a usage profile according to an aspect of the invention. Referring to FIG. 3, in 300, the PED detects an attempt by a user to access the PED. For example, the access attempt could be powering-up the PED, exiting sleep mode at the PED, etc.

Referring to FIG. 3, in 303, the PED determines its location using one or more of a plurality of position determination techniques. For example, if power usage is a priority for the PED, the PED may determine location based on a lowest power usage position determination technique, and may only use more power intensive position determination techniques if lower power usage techniques are not yielding sufficient results. For example, Table 1 (below) illustrates an order of position determination techniques with a power usage priority:

TABLE 1

| Order | Positioning Technique |
|---|---|
| 1 | Identify Internet Protocol (IP) address of local access point to determine subnet, which gives an approximate location |
| 2 | Cellular position determination |
| 3 | Hybrid Satellite Positioning System (SPS) and cellular position determination |
| 4 | SPS |

Alternatively, if the PED considers position accuracy to be higher in priority than power usage, Table 2 (below) illustrates an order of position determination techniques with a position precision priority:

TABLE 2

| Order | Positioning Technique |
|---|---|
| 1 | SPS |
| 2 | Hybrid SPS and cellular position determination |
| 3 | Cellular position determination |
| 4 | Identify Internet Protocol (IP) address of local access point to determine subnet, which gives an approximate location |

Of course, it is understood that other aspects of the invention may use other position determination techniques and/or orders, and that Tables 1 and 2 are given for example purposes only. Further, as will be appreciated, the term "location" or "position" is used in a broad manner in this application, such that "location" can indicate either geographic position, or any parameter that is associated or correlated with position. For example, if a PED can connect to a base station with a known, fixed coverage area, the PED knows that its location is within that coverage area, even if the precise location of the PED is not known. Further, the location determination of 303 may be performed continually in the background while the portable device is operated. In this case, to determine the location in 303, the PED may access a system variable for location that is made generally available to applications on the PED.

In 305, the PED determines whether learn mode is currently activated. If the PED determines that learn mode is activated, the process advances to 310 and the PED creates or updates a usage profile for the PED (as in 115 of FIG. 1). After creating/updating the usage profile in 310, the PED permits the user to access the PED in 315. While not illustrated in FIG. 3, an authentication step (e.g., as in 335) can be performed before the user is permitted to access the PED even if the determination of step 320 indicates the usage characteristics are conforming. In this case, a lesser degree of authentication is required from the user as compared to a situation where the step 320 indicates non-conforming behavior for the PED. Further, as will be appreciated, some or all security settings are essentially de-activated during learn mode so that new usage characteristics can be added to the user's profile (e.g., although authentication can be required from the user of the PED to enter into learn mode in the first place). Likewise, usage characteristics can be removed from the user's profile (e.g., after a given period of time, or via a manual command from the user).

Returning to 305, if the PED determines that learn mode is de-activated, the process advances to 320. In 320, the PED determines usage characteristics of the PED being accessed conform with the usage profile for that PED. As discussed above, the usage profile (e.g., which describes the environment(s) associated with previous authenticated, usage of the PED) can contain information such as (i) an access point (AP) that acts as a wired or wireless gateway for the portable electronic device, (ii) an estimate of a position of the portable electronic device obtained via satellite positioning system (SPS) (e.g., GPS), network trilateration and/or a subnet associated with an internet protocol (IP) address of the gateway and/or (iii) calendar information. As discussed above, the usage characteristics describe a current operating environment of the PED (i.e., how the PED is currently being used, in contrast with the usage profile which describes acceptable operating environments or usages), and can include the position of the PED as determined in 303, which is included in (ii), but can further include (i) and (iii), which can be measured at the PED separately from the location determination of 303. The remaining steps of FIG. 3 will now be described with reference to a number of examples based on different usage attempts by the user and different usage profiles.

In a first example, referring to 320 of FIG. 3, assume that the user logs onto the PED 205 in sector A6 as shown in FIG. 2, and that sectors A1 through A7 correspond to access points (APs). Further assume that the usage profile is as follows:

| Usage Category | Accepted Behaviors |
|---|---|
| Access Points (APs) | A5; A6 |

Example 1—Usage Profile

The PED 205 compares the list of APs in the usage profile with the current AP to which the PED 205 is connected to or is within range of, 320. For example, the PED 205 may ping a local AP to verify whether the local AP is within the usage profile. Here, access point A6 is the user's home network router, and as such falls within the usage profile of the PED 205. Thus, in 325, the PED 205 determines that the access attempt conforms with Example 1 of the usage profile, and the process advances to 315 (e.g., following, possibly, an authentication prompt of the user of the PED 205 associated with a lesser degree of authentication than if step 320 determined non-conforming activity or behavior of the PED), where the PED 205 permits access.

Figure 4:
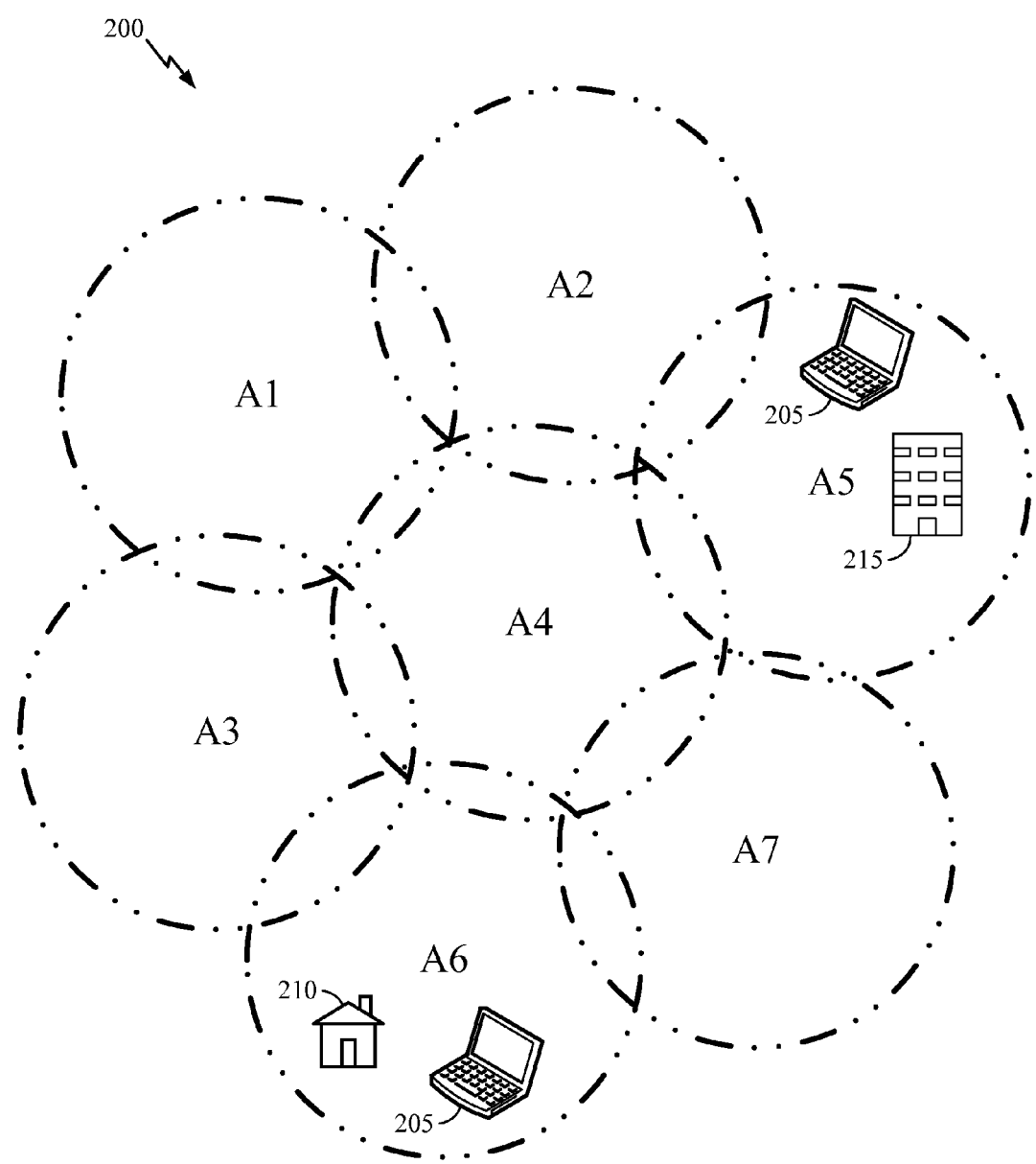
FIG. 4 illustrates another example of the wireless communications network of FIG. 2.

In a second example, referring to 320 of FIG. 3, assume that the user logs onto the PED 205 in sector A1 as shown in FIG. 4, and that sectors A1 through A7 correspond to access points (APs). Further assume that the usage profile is Example 1, as shown above. The PED 205 compares the list of APs in the usage profile with the current AP to which the PED 205 is connected to or is within range of, 320. Because A1 is not within the usage profile, in 325, the PED 205 determines that the access attempt does not conform with the usage profile, and the process advances to 330. In 330, the PED 205 prompts the user to satisfy one or more authentication protocols. For example, the authentication prompt may be for a password of the PED 205, the authentication prompt may be for biometric information (e.g., a fingerprint scan, a retinal scan, etc.), the authentication prompt may be one or more pre-configured questions (e.g., "What is your mother's maiden name?"), and/or any other well-known authentication technique or combination of authentication techniques. In an example, the authentication prompt of 330 may correspond to a heightened security level, such that the user would need to provide more authentication than would be required to simply log onto the PED 205 in 'conforming' sectors.

In a further example, the authentication prompt of 335 need not be performed if a user of the PED 205 has recently provided adequate authentication. In this example, authentication may be required for access to secure functions, such as financial transactions and/or network login or access to secure directories/data, but not necessarily to less-secure features of the PED 205. Again, once authenticated, the user need not keep re-authenticating unless a particular protected transaction is attempted.

Also, the degree of authentication required may be higher in less secure environments, or different usage profiles can be maintained and selectively used based on a level of security associated with a particular environment or location. Thus, in an example, the usage profile used to evaluate the usage in step 320 can be selected from one of a plurality of usage profiles based at least in part on the location of the PED 205. Alternatively, a single usage profile can be maintained in 320, and the PED 205 can instead react to security levels of different locations/environments by varying the degree of authentication at step 330 (e.g., increasing the amount of authentication for less secure environments, etc.). In a further example, different authentication methods may be used for the different security levels, such that a fingerprint scan may act as suitable authentication at any location, whereas a password entry may only be sufficient in a secure location, such as the user's home. In another example, both a dynamic selection of usage profiles and varying degrees of authentication can be implemented. Thus, both the environmental or operating conditions that determine conformity (i.e., the usage profile) and the degree of authentication can be manipulated to help ensure that the use of the PED 205 is appropriate.

If the PED 205 determines, 335, that the information provided by the user in response to the authentication prompt is sufficient to authenticate the user, the process advances to 310 and 315, where sector A1 is added to the usage profile and the user is permitted to access the PED 205. Here, the usage profile is updated even though the PED 205 is not engaged in learn mode because the user has provided adequate authentication. Alternatively, while not illustrated in FIG. 3, the updating of the usage profile may be optional and may only be performed if instructed by the user. For example, if the user of the PED 205 is at a location only temporarily and the user does not expect to return to that location, the user likely would not want that location to be approved for future access of the PED 205 without re-authentication.

Returning to 335, if the PED 205 determines that the information provided by the user in response to the authentication prompt is not sufficient to authenticate the user, the PED 205 denies access and locks itself, 340, and sends an alert message, 345. For example, the locking, 340, of the PED 205 may include encrypting any data contained therein to protect against unauthorized use. In an example, the decryption key for the PED 205 may be safeguarded at a central database and/or a backup of the data at a central storage facility. If the PED 205 is associated with higher-level security protocols, the locking step of 340 may further include shutting down the PED 205 such that subsequent accesses of the PED 205 cannot be attempted.

In a further example, the alert message, 345, may include one or more of (i) the time of the attempted, unauthorized access of the PED 205 and (ii) the location of the PED 205 (e.g., the PED's 205 local AP, the PED's 205 geographic location determined by GPS, etc.). The alert message, 345, may be configured to be sent to the central database and/or to the authorized user of the PED 205. Thus, if the PED 205 is stolen, the data is encrypted via the locking step and the authorized user (or administrator) is notified of the compromised PED. It is even possible that the locking step may include deleting information on the PED or formatting the PED entirely.

Returning to 320 of FIG. 3, in a third example, assume that the usage profile is as follows:

| Usage Category | Accepted Behaviors |
|---|---|
| Geographic Range | GPS_A5: 1 mile radius of Work Office 215; GPS_A6: 2 mile radius of Residential Home 210 |
| Calendar Information | GPS_A5 - MTWRF, 9:00 am-5:00 pm GPS_A6 - unrestricted access |

Example 2—Usage Profile

In Example 2 of the usage profile, sectors A1 through A7 correspond to geographic ranges as defined by a radial distance from a fixed GPS point, instead of access points as in Example 1 above. In particular, GPS_A5 is a range inclusive of any GPS location within a 1 mile radius of the work office 215, and GPS_A6 is a range inclusive of any GPS location within a 2 mile radius of the residential home 210. However, a real-world application may use a smaller area range for a Work or Home (e.g., or an "Other" category for locations that do not qualify as being associated with Work or Home) determination than in Example 2. Also, aside from using a geographic position (e.g., as derived by SPS or GPS), additional conditions such a visibility of certain signals at the PED (e.g., cellular signals, WiFi signals from local APs, SPS signals, etc.) may be used an addition to geographic location information. Further, Example 2 of the usage profile has added a calendar requirement, wherein attempted accesses to the PED 205 within GPS_A5 are only considered to conform to the usage profile during weekdays (i.e., MTWRF, which is an abbreviated manner of expressing Monday, Tuesday, Wednesday, Thursday and Friday). Thus, calendar information can be considered in a determination of whether a current usage of the device is conforming. For example, because GPS_A5 corresponds to the vicinity of the user's workplace, the user would typically be expected to access the PED 205 at the work office 215 within normal work hours. Likewise, attempted accesses to the PED 205 within GPS_A6 are unrestricted because it would be common for the user of the PED 205 to be at home at virtually any hour. Of course, the usage profile could be configured for particular users, such that the user's favorite coffee shop could be added to the usage profile and/or any location that the user visits frequently. Also, as shown in Example 2 above, each location could be associated with a time period where usage is expected. As will be appreciated by one of ordinary skill in the art, there are numerous possible variations to the usage profile that can be specially configured by each potential user of the PED.

Further, aside from a 'discrete' comparison with a current location that the PED is being accessed with a list of approved locations, a more in-depth determination of conforming usage can be made. For example, as mentioned in the preceding paragraph, calendar information relating to when a user is typically expected to be in certain locations can be used. In a further example, additional information can indicate where the PED is expected to be accessed. For example, assume the PED is assigned to a security officer who is scheduled to be traveling in China for two weeks. If the PED is accessed at the officer's home during this period, this can be considered a violation despite the home being an otherwise approved location due to the information related to the officer's travels. In a further example, physical impossibility or unlikelihood characteristics can be determined in evaluating conforming PED accesses. For example, if access of the PED is detected at a user's Home and Work locations within minutes of each other, it can be assumed that different users were attempting to access the device and/or duplicative device signatures are deployed in the network. In either case, this can be considered a violation for which additional authentication may be required before access of the PED is permitted.

Returning to 320 for Example 3 of the usage profile, the PED 205 compares the list of APs in the usage profile with the current AP to which the PED 205 is connected to or is within range of, 315. In 325, the PED 205 determines whether the access attempt conforms with Example 2 of the usage profile, and the process advances to 310 or 340 based on this determination, as discussed above in detail. As will be appreciated, Example 2 of the usage profile requires the PED 205 to measure both (i) time of day/week (e.g., by checking an internal clock at the PED 205) and (ii) the location of the PED 205 (in 303). The usage comparison of 320/325 may include a position determining process as discussed above with respect to 303, such as GPS, trilateration, hybrid SPS (i.e., a combination of SPS positioning with positioning based on terrestrial signals), positioning based on an IP address of the PED 205, and/or any other well-known positioning technique. The usage comparison of 320/325 may also include retrieving a current time (e.g., based on an internal clock at the PED 205, etc.).

As will be appreciated by one of ordinary skill in the art, the mobile nature of PEDs allows for security protocols based on the location of the PED. Additional security can be provided by associating the location of the PED with particular times wherein usage of the PED is expected at that location, and/or other parameters such as which signals are visible to the PED (e.g., cellular signals, WiFi signals, SPS signals, etc.). The user can optionally be given a chance to authenticate him or herself if the PED is being used in an unexpected manner. Alternatively, if the PED is associated with a higher level of security (e.g., the PED contains trade secrets, state secrets, etc.) the authentication step can be skipped altogether. If authentication is skipped or the user fails to authenticate properly, the PED can be encrypted and locked down, and a central database can be alerted to the unauthorized access attempt. Accordingly, the above-described aspects of the invention can achieve higher-levels of security as compared to PEDs having security protocols that do not take PED location into account in determining access grants.

While above-described aspects of the invention are directed to security protocols based on mobility characteristics of a PED, mobility characteristics can also be used to affect non-security preferences of a user, as will now be described with respect to FIGS. 5 and 6.

FIGS. 5A and 5B illustrate a location-based system settings process according to another aspect of the invention. In particular, FIG. 5A illustrates a process for establishing a plurality of "contexts," wherein each context is a set of system settings for a user of the PED, and FIG. 5B illustrates a process for selectively launching one of the plurality of contexts based on a mobility characteristic of the PED.

Referring to FIG. 5A, in 500, the user of the PED configures one or more contexts at the PED. For example, a context may include a screensaver, desktop background, Favorites links in a web browser, speed-dial settings if the PED is a phone, security and/or firewall settings and/or any other type of user-configurable setting at the PED. It will be appreciated that numerous variations of contexts are possible.

Next, in 505, the user of the PED instructs the PED to associate each context with a particular mobility characteristic. The mobility characteristic is similar, in some ways, to the usage profile discussed above with respect to FIGS. 1-4. For example, a given mobility characteristic can include (i) an access point (AP) that acts as a wired or wireless gateway for the PED, (ii) an estimate of a position of the PED obtained via GPS protocols, trilateration and/or a subnet associated with an internet protocol (IP) address of the gateway and/or (iii) calendar information. Thus, each context is associated with a particular mobility characteristic such that the context is triggered when the PED determines that the mobility characteristic is satisfied, as will now be described with respect to FIG. 5B.

Referring to FIG. 5B, in 510, the user logs onto the PED. While not illustrated within FIG. 5B, the log-on step of 510 can include the access protocols described above with respect to FIGS. 1-4. After the user is logged on, the PED determines its position, 513, as described above with respect to 303 of FIG. 3. The position of the PED can be determined in different ways. For example, a confidence level that the PED is located within a given geographic range can be determined, a GPS or SPS estimate can be determined, a list of available access points or base stations can be used to approximate a position of the PED, etc. Thus, it is understood that when a location or position is referred to in this aspect (or any other aspect in this application), the terms "location" and "position" are intended to be interpreted broadly as relating to an estimation of a general locality of the PED. Next, the PED compares the determined location of the PED with each user-defined mobility characteristic, 515. It is understood that, if the mobility characteristic includes a non-location attribute such as time of day, this attribute may also be measured by the PED and used in the comparison. In 520, the PED determines whether the comparison results in a match. If the comparison is determined to have resulted in a match, the process advances to 525 and the context associated with the matching mobility characteristic is launched at the PED. Otherwise, if no match is found, the PED loads default system settings (i.e., a default context) at the PED in 530. In some implementations other contexts may be used; e.g., the PED may prompt the user to select a context or configure an appropriate context, etc.

Again referring to FIG. 5B, after the context is loaded at the PED in either 525 or 530, the PED determines whether to change contexts in 535. The determination of 535 can be performed periodically, or in response to a triggering event. For example, a triggering event that could prompt a context re-evaluation and/or change could be that the mobility characteristic from 515 is no longer satisfied (e.g., the PED has left a sector required to satisfy the mobility characteristic, etc.). In another example, a triggering event that could prompt a context re-evaluation and/or change could be that the PED is attempting an e-commerce transaction. In another example, a triggering event that could prompt a context re-evaluation and/or change could be that the PED is determined to be at an unusual location and/or is exhibiting unusual behavior. If the PED determines not to change contexts in 535, the PED maintains the current context in 540, and can again return to 535 and determine whether to change contexts, for example, on a periodic basis or in response to a triggering event as discussed above. Otherwise, if the PED determines to change contexts in 535 (or at least evaluate current conditions in more depth to consider a context change), the process returns to 515.

An illustrative example of the process of FIGS. 5A and 5B will now be described with respect to FIG. 6. Referring to FIG. 6, the user of PED 205 configures a "work" context and a "home" context, 500. As will be appreciated, the work context includes system settings that are appropriate for a business setting, whereas the home context includes system settings that are more personal.

Next, in 505, the user of PED 205 associates the work context with sector A5 because sector A5 includes the work office 215, and further associates the home context with sector A6 because sector A6 includes the residential home 210. As discussed above, the "sectors" can be used to identify a location in any of a number of ways, such as by geographic points or regions identified by GPS, trilateration, etc., by IP addresses of routers or access point (e.g., the sector A6 could simply be the home network router of the user of the PED 205. Thus, sectors in the present illustrative example should be liberally construed.

In 510, the user of the PED 205 powers up and logs onto the PED 205 in sector A6 at the residential home 210. The log-on of step 510 is intended to illustrate one example of a triggering event that may cause a context to be loaded at the PED. Other triggering event examples are changes to the PED's location (e.g., if the user of the PED is driving a car), a manual selection by the user that indicates a desired context change, performing financial transactions, accessing sensitive information, changing system settings, etc. In 513, the PED 205 determines its location by one or more of GPS, trilateration, etc., as discussed above in 303 of FIG. 3. In 515, the PED 205 the determined location (and any other applicable attributes) of the PED 205 with the mobility characteristics associated with contexts, as established in 500 and 505 of FIG. 5A. Here, because the PED 205 is logged on in sector A6 and the user of PED 205 previously generated the home context associated with sector A6, a match is found in 520 and the home context is loaded onto PED 205 in 525 (e.g., as shown in the expanded image of PED 205 in sector A6 of FIG. 6).

Next, assume that the user of PED 205 drives to the work office 215, and further that the user keeps the PED 205 powered up during the drive. In traveling to the work office 215 from the residential home 210, the PED 205 leaves sector A6, traverses sectors A4 and/or A7, and then enters sector A5 where the work office 215 is located. Upon leaving sector A6 and entering sectors A4 and/or A7, the PED 205 determines to change contexts in 535, determines that sectors A4 and/or A7 do not match a mobility characteristic established by the user in 515 and 520, and thereby loads default system settings, or a default context, in 530 (e.g., as shown in the expanded image of PED 205 in sectors A4/A7 of FIG. 6). Thus, default context is used in environments that are not defined, have no setting for a particular attribute, or in response to a manual context selection by the user of the PED 205. When the PED 205 enters sector A5 from sectors A4 and/or A7, the PED 205 determines to change contexts in 535, determines that sector A6 matches a mobility characteristic established by the user in 515 and 520, and loads the work context in 525 (e.g., as shown in the expanded image of PED 205 in sector A5 of FIG. 6).

Figure 6:
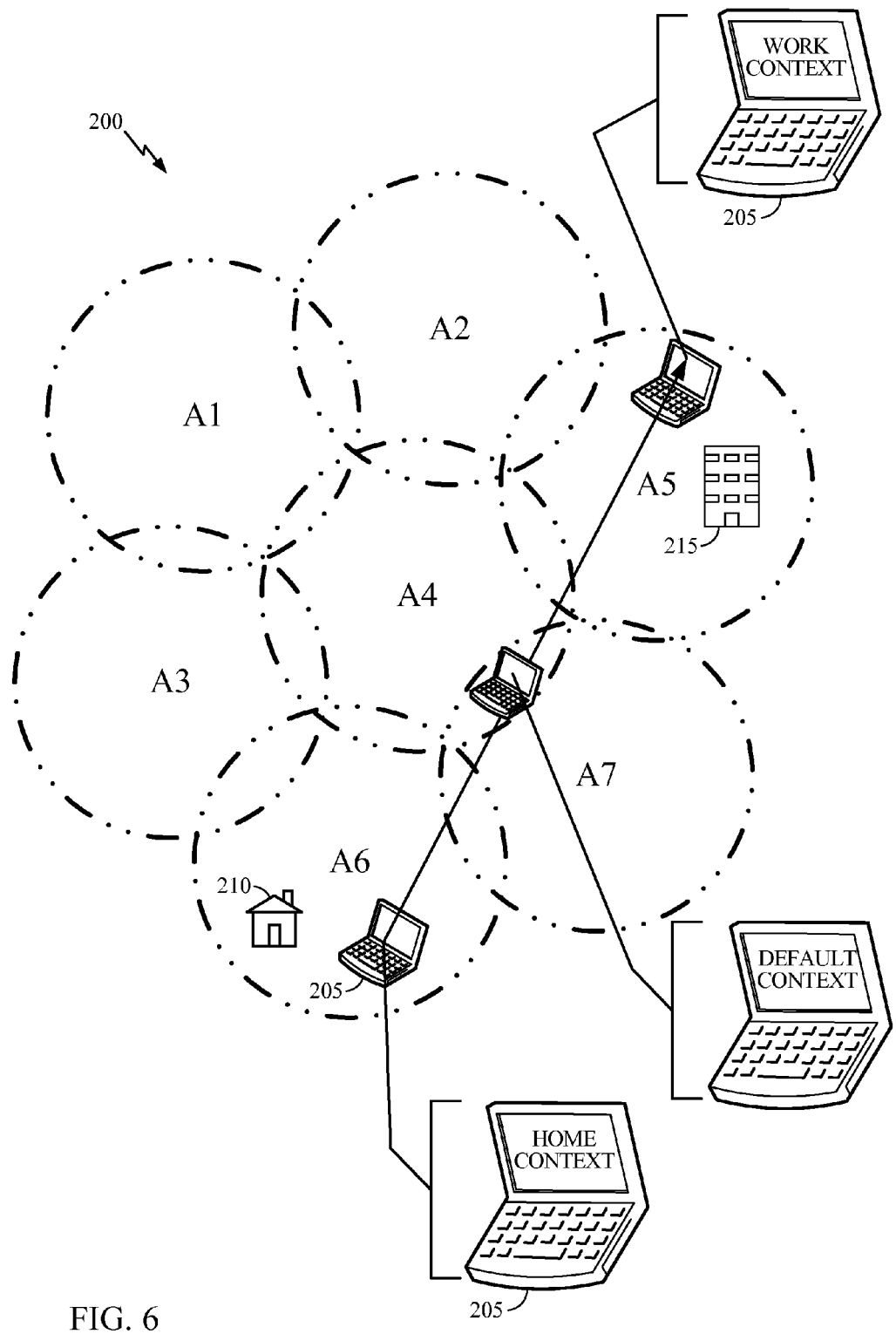
FIG. 6 illustrates another example of the wireless communications network of FIG. 2.

While the above illustrative example given with respect to FIG. 6 is directed to a mobility characteristic based only on location, it will be appreciated that other aspects of the invention may incorporate additional conditions for launching contexts. For example, calendar information can be incorporated, such that, for example, contexts are only loaded if the PED is located in the correct sector at the correct time of day, day of week, etc.

As discussed above, FIGS. 1-4 are generally directed to security protocols based on a usage profile of a PED. However, location based security is not necessarily limited to PEDs, as will be described below with respect to FIG. 7.

Economic transactions via any electronic device (e.g., a stationary desktop computer, a laptop computer, a cell phone, etc.) that involve Internet purchases or sales are referred to as "e-commerce". E-commerce is rapidly expanding globally, as customers are transitioning from retail stores to virtual, online stores. However, identity theft, credit card fraud and other Internet-based fraud (e.g., phishing, etc.) cause economic loss as well as a loss of consumer trust in the e-commerce system.

Conventional security measures for authenticating ATM transactions include (i) passwords and/or (ii) a comparison of current transaction characteristics with past behavior of the consumer. For example, if a consumer goes to the same ATM machine every week for 5 years and withdraws $200 at each transaction and enters the same PIN each time, the consistency of the withdrawal amounts, PIN verification, etc. will not arouse suspicion of debit card theft. However, if the same debit card is used in Russia to withdraw $5000, this will qualify as suspicious activity worthy of further authentication procedures. The ATM system generally works because each ATM is at a fixed location, and the location of each ATM is known, in advance of any transaction, to the system administrators of the ATM system.

Unlike the ATM transaction example given above, location-based security protocols for e-commerce transactions have yet to be adopted. For example, if a consumer is shopping at a website, such as www.amazon.com, and the consumer adds items to his/her cart and makes an online purchase, the location of the consumer is unknown and is not used to evaluate whether the e-commerce transaction is legitimate. As will now be described with respect to FIG. 7, an aspect of the invention is directed to location-based security protocols for e-commerce transactions.

Figure 7:
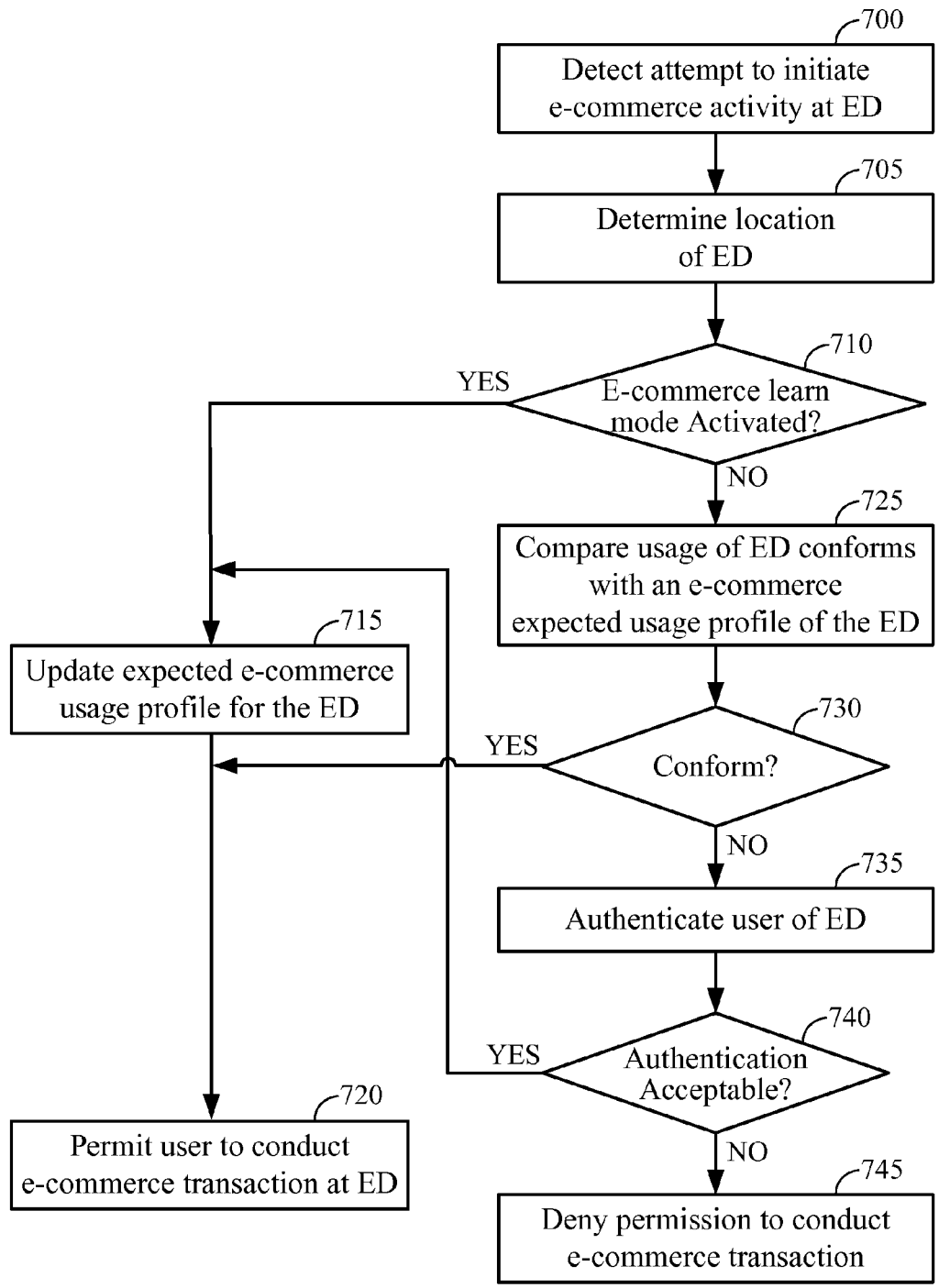
FIG. 7 illustrates location-based security protocols for e-commerce transactions, according to an aspect of the invention.

Referring to FIG. 7, in 700, an electronic device (ED) (e.g., a laptop computer, a desktop computer, a cell phone, etc.) detects an attempt by a user to initiate e-commerce activity at the ED. For example, the e-commerce activity could be purchasing one or more items from an Internet website. In 705, the ED determines its location, as described above with respect to 303 and 513. The determining step 705 can be performed in response to an authentication prompt from the Internet website, or alternatively can be initiated by the ED itself. The ED can determine its location using any well-known positioning methodology, including but not limited to identifying an access point (AP) that acts as a wired or wireless gateway for the ED, SPS (e.g., GPS), network trilateration, etc. Further, the location of the ED can be determined via a background process, and need not actually be dynamically determined at step 705, but can be loaded from a system variable indicating ED location in an example. Also, aside from location, the ED may consider or detect other factors or parameters ("e-commerce usage characteristics") such as the Web Site associated with the e-commerce transaction, the types of items being purchases, the total transaction amount, etc.

In 710, the ED determines whether learn mode is currently activated for e-commerce transactions. In example, the learn mode can be entered into upon receipt of sufficient authentication information from the user (e.g., if the user provides a master authentication key or otherwise satisfies a highest level of authentication, etc.). Also, similar to the learn mode described above with respect to PED 205 access, e-commerce learn mode can be activated for a given amount of time, after which learn mode is exited. For example, the user of the ED can manually instruct the ED to exit learn mode. In another example, learn mode may be configured for exit after a given amount of time, which may be configured by the user upon entry into learn mode at 100 and/or defaulted by the ED for exiting after a default period of time. In an example implementation, e-commerce learn mode as in FIG. 7 differs from the 'access' learn mode described above with respect to FIGS. 1 and 3. E-commerce learn mode generates an e-commerce usage profile, which includes locations and/or other conditions where e-commerce activity is permitted. Thus, if a user conducts e-commerce activity at all locations where the user accesses the ED, the e-commerce usage profile can be the same as the access usage profile. However, it will be appreciated that if e-commerce activity is not initiated at all access locations, the two usage profiles may differ. In another example, certain locations may be associated with more risk than other locations, even if the ED is expected to be accessed at each location. Thus, the more risky locations can be associated with more stringent authentication before the e-commerce activity is approved and/or before learn mode is entered. Further, for static or stationary EDs, such as desktop computers, the access usage profile may not be engaged due to the lack of the ED's mobility. In this case, the location of the ED can still be relevant as the e-commerce usage profile need not be tied to a particular ED, but rather to user that conducts e-commerce transactions at different locations with different EDs.

In another example implementation, however, the e-commerce usage profile could simply be set equal to the access usage profile. In this case, the e-commerce learn mode generates the e-commerce usage profile as in FIG. 1 described above. Further, the e-commerce usage profile may remain engaged even if the access usage profile is not used. In another example, the e-commerce profile could be pre-determined by the user or other person such as IT manager for particular environments such as home or work.

Referring to FIG. 7, in 710, if the ED determines that e-commerce learn mode is activated, the process advances to 715 and the ED creates or updates an e-commerce usage profile for the ED (e.g., as in 115 of FIG. 1, by adding the determined location to a list of authorized locations, etc.) or for the user if the user conduct's e-commerce transactions on different EDs. After creating/updating the usage profile in 715, the ED permits the user to conduct e-commerce activity at the ED in 720.

Returning to 710, if the ED determines that e-commerce learn mode is de-activated, the process advances to 725. In 725, the ED compares usage characteristics (e.g., the determined location from 705, calendar information, etc.) of the PED being accessed with the usage profile for that PED. As discussed above, the usage profile can contain information such as (i) an access point (AP) that acts as a wired or wireless gateway for the portable electronic device, (ii) an estimate of a position of the portable electronic device obtained via global positioning system (GPS) protocols, trilateration and/or a subnet associated with an internet protocol (IP) address of the gateway and/or (iii) calendar information. The remaining steps of FIG. 7 will now be described with reference to examples based on different usage attempts by the user and different usage profiles. Examples of 'access' usage profiles have been discussed in detail above with respect to FIGS. 1-4. For convenience of explanation, assume that the e-commerce usage profile may generally be configured in a manner similar to that of the access usage profile. Thus, additional explicit examples of usage profiles for e-commerce have been omitted for the sake of brevity.

Accordingly, in 730, the ED determines whether the current usage of the ED conforms with the e-commerce usage profile. For example, if the ED is a desktop PC and the user is conducting an e-commerce transaction at home, the position of the ED (e.g., based on GPS, etc.) is compared with the e-commerce usage profile, and the ED is likely to determine conformity. If the ED determines that the current usage of the ED conforms with the e-commerce usage profile, the process advances to 720 and the e-commerce transaction is permitted (e.g., following, possibly, an authentication prompt of the user of the ED associated with a lesser degree of authentication than if step 730 determined non-conforming activity or behavior of the ED). Otherwise, the process advances to 735.

In 735, the ED prompts the user to satisfy one or more authentication protocols. For example, the authentication prompt may be for a password of the ED, the authentication prompt may be for biometric information (e.g., a fingerprint scan, a retinal scan, etc.), the authentication prompt may be one or more pre-configured questions (e.g., "What is your mother's maiden name?"), and/or any combination thereof. In a further example, the ED authentication prompt may be adjusted based on a usage history of the ED, or also based on the risk level associated with the ED's current location. For example, if the user of the ED is at a coffee shop that the user has made e-commerce purchases from numerous times in the past, a lower level of authentication may be require than if the ED is determined to be at an airport from which no e-commerce activity has previously been conducted.

If the ED determines, 740, that the information provided by the user in response to the authentication prompt is sufficient to authenticate the user, the process advances to 715 and 720, where the ED's current location (and/or other usage criteria, such as time of day, etc. if so desired by the user) is added to the e-commerce usage profile, 715, (unless the e-commerce usage profile already contains this usage, in which case this step is bypassed) and the user is permitted to conduct the e-commerce transaction, 720. While not illustrated in FIG. 7, the ED could prompt the user for authentication even though the e-commerce usage characteristics conform with the e-commerce usage profile, although a lesser degree of authentication would generally be required than if the e-commerce usage characteristics were non-conforming. Alternatively, while not illustrated in FIG. 7, the updating of the usage profile may be optional and only performed if instructed by the user. For example, if the user of the ED is at a location only temporarily and the user does not expect to return to that location, the user likely would not want that location to be approved for future e-commerce transactions (e.g., if the user accidentally left the ED at that location, fraudulent purchases could be made).

Returning to 740, if the ED determines that the information provided by the user in response to the authentication prompt is not sufficient to authenticate the user, the e-commerce transaction is not permitted to continue, 745. Alternatively, instead of actually blocking the e-commerce transaction, the user of the ED may instead be forced to manually authenticate the e-commerce transaction (e.g., with a phone call, by re-entering credit card information with the e-commerce site, etc.). Further, while not illustrated in FIG. 7, the user may configure the ED to perform the locking and alerting steps 340 and 345, as discussed above with respect to FIG. 3.

As will be appreciated by one of ordinary skill in the art, the e-commerce usage profile is, in some ways, broader than that of the access usage profile. The e-commerce usage profile can be configured to be either ED-specific, or alternatively can be user-specific and applied to multiple EDs and/or PEDs, whereas the access usage profile is always applied to one particular PED. Thus, the user could configure the same e-commerce usage profile to be used as a security safeguard for purchases made at the user's home computer, work computer and/or cell phone, and can be applied to both stationary/static EDs and PEDs.

Further, while above-described aspects of the invention have been described separately, in accordance with other aspects of the invention any aspects that are not mutually exclusive may be performed concurrently. For example, the process of FIG. 3 may be performed concurrently with the process of FIGS. 5A/5B and/or the process of FIG. 7. In other words, the location-based security process that determines whether an access attempt of the PED can be permitted in FIG. 4 can be performed concurrently with the location-based context loading/updating process of FIGS. 5A/5B that affects system settings at the PED.

Figure 8:
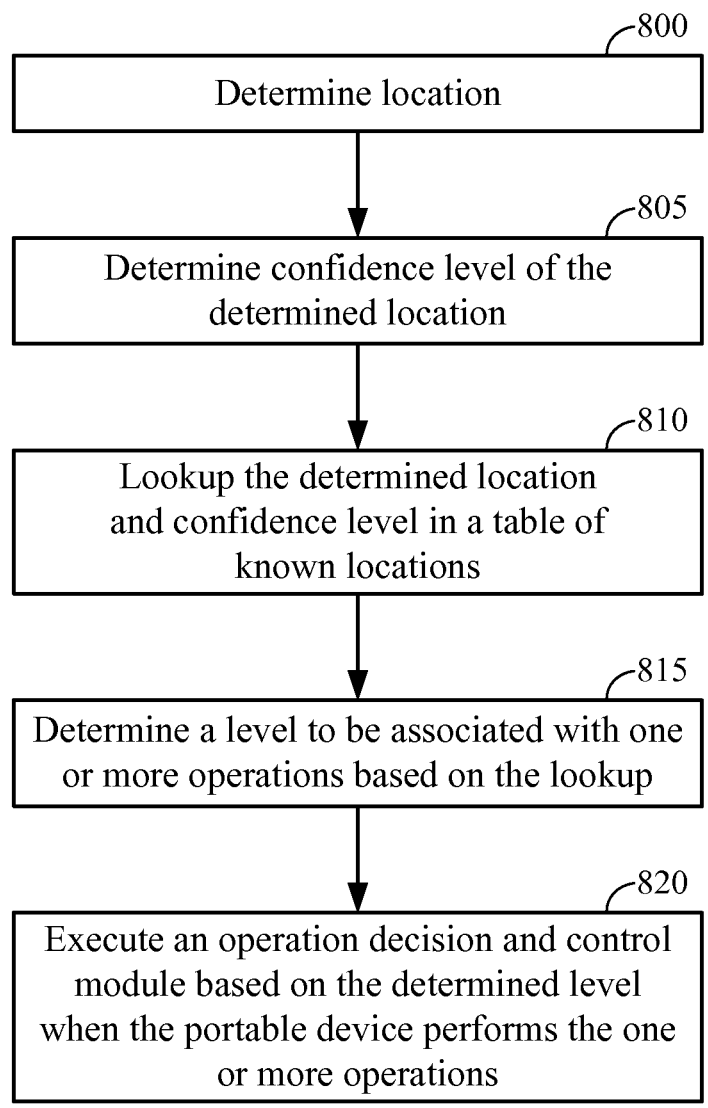
FIG. 8 illustrates an operation execution process based at least in part upon a location criterion according to an aspect of the invention.

Also, the processes of FIGS. 3, 5B and 7 can be linked via a more generalized location-based settings process, as will now be described with respect to FIGS. 8 and 9. FIG. 8 illustrates an operation execution process based at least in part upon a location criterion according to an aspect of the invention. Referring to FIG. 8, an electronic device determines its location using one or more location determination methodologies, 800. In an example, step 800 of FIG. 8 may correspond to 303 of FIG. 3, 513 of FIG. 5B and/or 705 of FIG. 7. In other words, the location determined in 800 may be used in any or all of these processes.

Next, in 805, the electronic device determines a confidence level to be associated with the location determined in 800. For example, the confidence level can be based on the type of location determining methodology (e.g., GPS may have a higher confidence level than triangulation, etc.). In another example, the confidence level may be based on other factors. In 810, the electronic device accesses a lookup table that includes a list of known locations or location ranges. The electronic device compares the location determined in 800 with the locations stored in the lookup table to find a matching entry. The confidence level may also be used at this point (e.g., to expand upon the determined location if the confidence level is relatively low). Upon finding a match, the electronic device determines a level to be associated with one or more operations based on the lookup, 815. The operations can include an access attempt authorization procedure (e.g., see FIG. 3), a context loading procedure (e.g., see FIGS. 5A/5B), an e-commerce transaction authorization procedure (e.g., see FIG. 7), a general security protocol to be applied at the electronic device, etc. In an example, the location and/or confidence level are only two factors that may determine the operation level values stored in the lookup table. In another example, additional criteria may be used by the lookup table in providing the operation level values. A more detailed example of this step is provided below with respect to FIG. 9.

Referring to FIG. 8, in 820, the electronic device executes at least one operation decision and control module based on the determined level when the portable device performs an associated operation. Thus, if a level is determined in 815 for e-commerce transactions, and an e-commerce transaction is detected, an operation decision and control module governing e-commerce transactions is executed with protocols corresponding to the determined level in 820. Additional examples are provided below with respect to FIG. 9.

Figure 9:
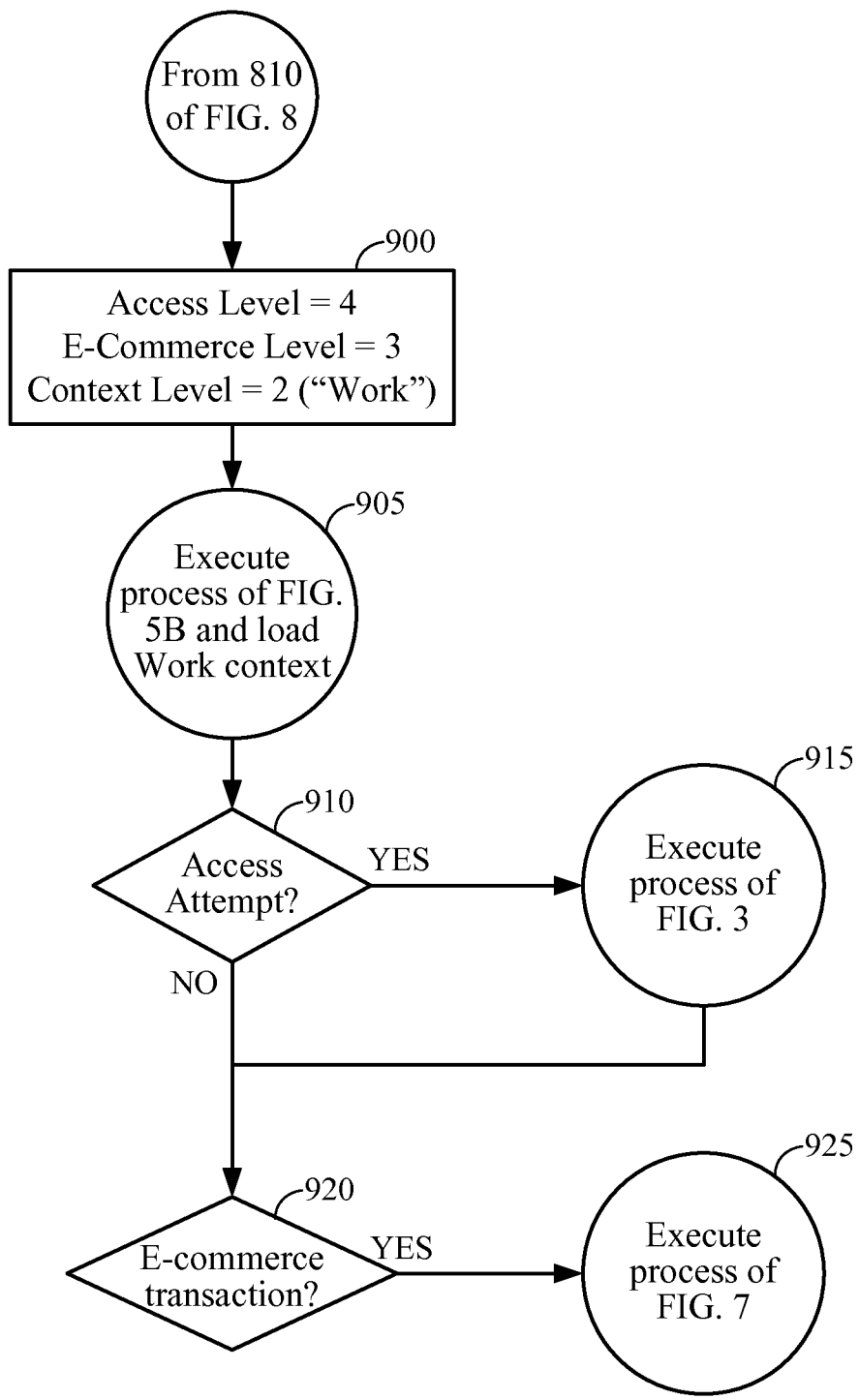
FIG. 9 illustrates a more detailed example of the process of FIG. 8

FIG. 9 illustrates a more detailed example of the process of FIG. 8, which is described below in conjunction with the processes of 3, 5B and 7. Referring to FIG. 9, assume that steps 800, 805 and 810 of FIG. 8 execute, and the process advances to 900. In 900, assume that the lookup table (810) indicates that levels 4, 3 and 2, respectively, are associated with an access attempt authorization procedure, a context loading procedure and an e-commerce transaction authorization procedure, respectively, for the determined position (800) and confidence level (805). The different levels correspond to different protocols that may be applied for the different operations. In an example, higher level values for access attempts correspond to a higher level of user authentication before access is granted. In another example, different context level values correspond to different environments, such as a Work context, Home context, School context, etc. As will be appreciated, 900 of FIG. 9 corresponds to a more detailed version of 815 of FIG. 8.

After the level values are determined in 900, the process advances to 905, where the process of FIG. 5B is executed for context level value 2. In this example, assume context level 2 corresponds to a Work context. Accordingly, in 905, because the context level value already indicates the context to be loaded, the process advances to 525 of FIG. 5B, where the Work context is loaded. FIG. 5B may continue to be executed concurrently with FIG. 9. Next, in 910, the electronic device determines whether an access attempt of the electronic device is detected (e.g., as in 300 of FIG. 3). If an access attempt is detected, the process advances to 915, and the process of FIG. 3 is executed for access attempt level 4. In an example, different access attempt level values may affect the process of FIG. 3 in different ways. For example, higher access attempt level values may include fewer or more narrow expected usage profiles of the PED, which makes conformity more difficult to achieve, such that access of the PED is better secured. On the other hand, if the access attempt level value is relatively low (e.g., 0), certain authorization or authentication procedures illustrated in FIG. 3 may be skipped entirely. For example, if the access attempt level value is 0, step 320 of FIG. 3 may allow any behavior of the PED to be conforming and may skip the authentication step of 330/335, such that the PED user is assumed authenticated.

After the process of FIG. 3 is executed, the electronic device determines whether an e-commerce transaction is detected (e.g., as in 700 of FIG. 7). If an e-commerce transaction attempt is detected, the process advances to 925, and the process of FIG. 7 is executed for e-commerce transaction attempt level 3. In an example, different e-commerce transaction level values may affect the process of FIG. 7 in different ways. For example, higher e-commerce transaction level values may include fewer or more narrow e-commerce expected usage profiles of the ED, which makes conformity more difficult to achieve, such that e-commerce transactions are better secured. On the other hand, if the e-commerce transaction attempt level value is relatively low (e.g., 0), certain authorization or authentication procedures illustrated in FIG. 7 may be skipped entirely. For example, if the e-commerce transaction level value is 0, step 725 of FIG. 7 may allow any behavior of the ED to be conforming and may skip the authentication step of 735/740, such that the ED user is assumed authenticated.

Further, the order in which the processes of FIGS. 3, 5B and 7 are executed or evaluated to be executed in FIG. 9 need not be the order illustrated in FIG. 9, but can rather be in any order. Likewise, different types of operations may be managed by the process of FIG. 8 or 9 in other aspects of the invention.

While aspects of the invention presented above are directed to using varying degrees of authentication to enter a learn mode for adding access permissions of a PED and/or e-commerce permissions of an ED, for permitting access to the PED based on an expected usage profile of the PED, or permitting an e-commerce transaction at the ED based on an expected e-commerce usage profile, it will be appreciated that one or more authentications can be used as a 'master' key or override that will enable a user of that ED or PED full access to the ED or PED. For example, a biometric authentication (e.g., a retinal scan, a fingerprint scan, a DNA scan, etc.) can be used as a master authentication key that permits full access. If a master authentication key is enabled, the processes described above will bypass their respective authentication steps such that the process will advance such that proper authentication has been granted. In an example, a master authentication key can be valid for a given amount of time, at which point the user will again have to obtain a master authentication key or else revert to the authentication procedures described above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of physical storage medium known in the art. An exemplary storage medium is coupled to the processor such that the processor can read information from, and write information to, the storage medium. In the alternative, the storage medium may be integral to the processor.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of securing an e-commerce transaction at an electronic device, comprising:
   detecting an attempt to conduct the e-commerce transaction at the electronic device;
   identifying usage characteristics associated with the detected attempt, wherein the usage characteristics include a location of the electronic device where the e-commerce transaction is being attempted, a time at which the e-commerce transaction is being attempted, and one or more parameters of the e-commerce transaction;
   determining whether the usage characteristics associated with the detected attempt conform with an e-commerce usage profile associated with the electronic device or a user of the electronic device, the e-commerce usage profile including one or more locations of the electronic device where e-commerce transactions are permitted, one or more time periods during which e-commerce transactions are permitted at the one or more locations of the electronic device, and parameters of permissible e-commerce transactions, wherein the one or more locations of the electronic device where e-commerce transactions are permitted are a subset of a second set of one or more locations of the electronic device stored in an access usage profile associated with the electronic device where access to the electronic device is permitted, and wherein the e-commerce usage profile is stored on the electronic device;
   determining whether to permit the e-commerce transaction at the electronic device based on whether the usage characteristics conform with the e-commerce usage profile; and
   based on determining to permit the e-commerce transaction, prompting the user of the electronic device for authentication information, wherein an authentication level associated with the user prompt is based on a degree to which the usage characteristics associated with the detected attempt conform with the e-commerce usage profile.

2. The method of claim 1, wherein the one or more parameters of the e-commerce transaction include a Web Site associated with the e-commerce transaction, types of items being purchased in the e-commerce transaction or a total transaction amount of the e-commerce transaction, or any combination thereof.

3. The method of claim 1, wherein the e-commerce usage profile includes at least one of a list of locations or location ranges and a list of Web Sites, a list of item types, one or more transaction amount thresholds, or any combination thereof.

4. The method of claim 1, further comprising:
   denying the electronic device permission to conduct the e-commerce transaction based on the user not providing adequate authentication in response to the user prompt.

5. The method of claim 4, further comprising:
   prompting the user for manual authentication in response to the denying.

6. The method of claim 4, further comprising:
   permitting the electronic device permission to conduct the e-commerce transaction based on the user providing adequate authentication in response to the user prompt.

7. The method of claim 6, further comprising:
   updating the e-commerce usage profile such that, for future e-commerce transactions, the usage characteristics associated with the detected attempt indicate conformity with the e-commerce usage profile.

8. The method of claim 6, wherein the one or more locations correspond to at least one of a geographic location of the electronic device, whether the electronic device resides in a given geographic range, or signals received at the electronic device.

9. The method of claim 8, wherein the received signals include one or more of cellular signals, WiFi signals or satellite positioning system (SPS) signals.

10. An electronic device, comprising:
a logic circuit configured to detect an attempt to conduct an e-commerce transaction at the electronic device;
a logic circuit configured to identify usage characteristics associated with the detected attempt, wherein the usage characteristics include a location of the electronic device where the e-commerce transaction is being attempted, a time at which the e-commerce transaction is being attempted, and one or more parameters of the e-commerce transaction;
a logic circuit configured to determine whether the usage characteristics associated with the detected attempt conform with an e-commerce usage profile associated with the electronic device or a user of the electronic device, the e-commerce usage profile including one or more locations of the electronic device where e-commerce transactions are permitted, one or more time periods during which e-commerce transactions are permitted at the one or more locations of the electronic device, and parameters of permissible e-commerce transactions, wherein the one or more locations of the electronic device where e-commerce transactions are permitted are a subset of a second set of one or more locations of the electronic device stored in an access usage profile associated with the electronic device where access to the electronic device is permitted, and wherein the e-commerce usage profile is stored on the electronic device;
a logic circuit configured to determine whether to permit the e-commerce transaction at the electronic device based on whether the usage characteristics conform with the e-commerce usage profile; and
a logic circuit configured to prompt, based on a determination to permit the e-commerce transaction, the user of the electronic device for authentication information, wherein an authentication level associated with the user prompt is based on a degree to which the usage characteristics associated with the detected attempt conform with the e-commerce usage profile.

11. The electronic device of claim 10, wherein the one or more parameters of the e-commerce transaction include a Web Site associated with the e-commerce transaction, types of items being purchased in the e-commerce transaction or a total transaction amount of the e-commerce transaction, or any combination thereof.

12. A non-transitory computer-readable medium comprising instructions, which, when executed by an electronic device, cause the electronic device to perform operations, the instructions comprising:
program code to detect an attempt to conduct an e-commerce transaction at the electronic device;
program code to identify usage characteristics associated with the detected attempt, wherein the usage characteristics include a location of the electronic device where the e-commerce transaction is being attempted, a time at which the e-commerce transaction is being attempted, and one or more parameters of the e-commerce transaction;
program code to determine whether the usage characteristics associated with the detected attempt conform with an e-commerce usage profile associated with the electronic device or a user of the electronic device, the e-commerce usage profile including one or more locations of the electronic device where e-commerce transactions are permitted, one or more time periods during which e-commerce transactions are permitted at the one or more locations of the electronic device, and parameters of permissible e-commerce transactions, wherein the one or more locations of the electronic device where e-commerce transactions are permitted are a subset of a second set of one or more locations of the electronic device stored in an access usage profile associated with the electronic device where access to the electronic device is permitted, and wherein the e-commerce usage profile is stored on the electronic device;
program code to determine whether to permit the e-commerce transaction at the electronic device based on whether the usage characteristics conform with the e-commerce usage profile; and
program code to prompt, based on a determination to permit the e-commerce transaction, the user of the electronic device for authentication information, wherein an authentication level associated with the user prompt is based on a degree to which the usage characteristics associated with the detected attempt conform with the e-commerce usage profile.

13. The non-transitory computer-readable medium of claim 12, wherein the one or more parameters of the e-commerce transaction include a Web Site associated with the e-commerce transaction, types of items being purchased in the e-commerce transaction or a total transaction amount of the e-commerce transaction, or any combination thereof.

\* \* \* \* \*